United States Patent
Spoerke et al.

(10) Patent No.: US 11,962,009 B1
(45) Date of Patent: *Apr. 16, 2024

(54) LOW TEMPERATURE SODIUM BATTERY COMPRISING AN ELECTROCHEMICALLY ACTIVE MOLTEN INORGANIC CATHOLYTE

(71) Applicant: National Technology & Engineering Solutions of Sandia, LLC, Albuquerque, NM (US)

(72) Inventors: Erik D. Spoerke, Albuquerque, NM (US); Stephen J. Percival, Albuquerque, NM (US); Martha M. Gross, Albuquerque, NM (US); Rose Y. Lee, Las Cruces, NM (US); Leo J. Small, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/505,413

(22) Filed: Oct. 19, 2021

Related U.S. Application Data

(63) Continuation-in-part of application No. 16/564,751, filed on Sep. 9, 2019, now Pat. No. 11,258,096.

(51) Int. Cl.
*H01M 4/58* (2010.01)
*H01M 4/36* (2006.01)
(Continued)

(52) U.S. Cl.
CPC .......... *H01M 4/582* (2013.01); *H01M 4/368* (2013.01); *H01M 4/381* (2013.01);
(Continued)

(58) Field of Classification Search
CPC ...... H01M 4/582; H01M 4/368; H01M 4/381; H01M 10/054; H01M 10/0562;
(Continued)

(56) References Cited

U.S. PATENT DOCUMENTS 9,553,337 B2  1/2017  Chae et al.
10,153,517 B2  12/2018  Chae et al.
(Continued)

FOREIGN PATENT DOCUMENTS

JP     10144343 A  *  5/1998
JP     10144343 A     5/1998
WO  WO2018187777 A1  10/2018

OTHER PUBLICATIONS

Small, Leo J., Paul G. Clem, and Erik David Spoerke. Electroless Process for Depositing Tungsten Metal for Sodium Battery Electrodes. No. SAND2016-9318C. Sandia National Lab.(SNL-NM), Albuquerque, NM (United States), 2016 (Year: 2016).*

(Continued)

*Primary Examiner* — Matthew T Martin
*Assistant Examiner* — Grace Ann Kenlaw
(74) *Attorney, Agent, or Firm* — Kevin W. Bieg

(57) ABSTRACT

A high-performance electrochemically active sodium molten salt catholyte enables a dramatic reduction in molten sodium battery operating temperature from near 300° C. to less than 120° C. As an example, stable electrochemical cycling was demonstrated in a high voltage (3.65 V) sodium battery comprising a sodium iodide-gallium chloride (NaI—GaCl$_3$) molten salt catholyte for over 8 months at 110° C. The combination of high voltage, stable cycling behavior, and practical current densities supported by a molten catholyte enables a new generation of transformative high performance, low temperature molten sodium batteries.

16 Claims, 13 Drawing Sheets

(51) Int. Cl.
H01M 4/38 (2006.01)
H01M 10/054 (2010.01)
H01M 10/0562 (2010.01)
H01M 10/0563 (2010.01)
H01M 50/434 (2021.01)

(52) U.S. Cl.
CPC ..... *H01M 10/054* (2013.01); *H01M 10/0562* (2013.01); *H01M 10/0563* (2013.01); *H01M 50/434* (2021.01); *H01M 2300/0054* (2013.01); *H01M 2300/0074* (2013.01)

(58) Field of Classification Search
CPC ........... H01M 10/0563; H01M 50/434; H01M 2300/0054; H01M 2300/0074; H01M 4/0476; H01M 10/399; H01M 2300/0022; H01M 2300/0045
See application file for complete search history.

(56) References Cited

U.S. PATENT DOCUMENTS

| | | | | |
|---|---|---|---|---|
| 2011/0070496 | A1* | 3/2011 | Soloveichik | H01M 10/39 252/519.4 |
| 2013/0084485 | A1* | 4/2013 | Vallance | C23F 13/14 429/231.95 |
| 2013/0183546 | A1* | 7/2013 | Joshi | H01M 6/185 204/252 |
| 2015/0147619 | A1* | 5/2015 | Chae | H01M 4/381 429/104 |
| 2016/0049658 | A1* | 2/2016 | Chae | H01M 10/3954 429/104 |

OTHER PUBLICATIONS

Goodenough, J.B. "Electrochemical Energy Storage in a Sustainable Modern Society," Energy Environ. Sci., vol. 7 (2014), pp. 14-18.
Yang, Z. et al., "Electrochemical Energy Storage for Green Grid," Chem. Rev., vol. 111 (2011), pp. 3577-3613.
Ha, S. et al., "Sodium-Metal Halide and Sodium-Air Batteries," ChemPhysChem, vol. 15 (2014), pp. 1971-1982.
Sudworth, J.L., "The Sodium/Nickel Chloride (Zebra) Battery," Journal of Power Sources, vol. 100 (2001), pp. 149-163.
Kumar, D. et al., "Progress and Prospects of Sodium-Sulfur Batteries: A Review," Solid State Ionics, vol. 312 (2017), pp. 8-16.
Dunn, B. et al., "Electrical Energy Storage for the Grid: A Battery of Choices," Science, vol. 334 (2011), pp. 928-935.
Hueso, K.B. et al., "High Temperature Sodium Batteries: Status, Challenges and Future Trends," Energy Environ. Sci., vol. 6 (2013), pp. 734-749.
Lu, X. et al., "Liquid-Metal Electrode to Enable Ultra-Low Temperature Sodium-Beta Alumina Batteries for Renewable Energy Storage," Nature Communications, vol. 5 (2014), 4578, 8 pages.
Manthiram, A. et al., "Ambient Temperature Sodium-Sulfur Batteries," Small, vol. 11, No. 18 (2015), pp. 2108-2114.
Liu, C. et al., "An Ambient Temperature Molten Sodium-Vanadium Battery with Aqueous Flowing Catholyte," ACS Appl. Mater. Interfaces, vol. 8 (2016), pp. 1545-1552.
Pang, W.-L., et al., "P2-type Na2/3Mn1-xAlxO2 Cathode Material for Sodium-Ion Batteries: Al-Doped Enhanced Electrochemical Properties and Studies on the Electrode Kinetics," Journal of Power Sources, vol. 356 (2017), pp. 80-88.
Wan, F. et al., "Nanoeffects Promote the Electrochemical Properties of Organic Na2C8H4O4 as Anode Material for Sodium-Ion Batteries," Nano Energy, vol. 13 (2015), pp. 450-457.
Jolley, A.G. et al., "Improving the Ionic Conductivity of NaSICON Through Aliovalent Cation Substitution of Na3Zr2Si2PO12," Ionics, vol. 21 (2015), pp. 3031-3038.
Jolley, A.G. et al., "Structural Investigation of Monoclinic-Rhombohedral Phase Transition in Na3Zr2Si2PO12 and Doped NaSICON," J. Am. Ceram. Soc., vol. 98 (2015), pp. 2902-2907.
Lu, X. et al., "Advanced Materials for Sodium-Beta Alumina Batteries: Status, Challenges and Perspectives," Journal of Power Sources, vol. 195 (2010), pp. 2431-2442.
Lu, X. et al. "The Effects of Temperature on the Electrochemical Performance of Sodium-Nickel Chloride Batteries," Journal of Power Sources, vol. 215 (2012), pp. 288-095.
Kim, J. et al., "Low Temperature Performance of Sodium-Nickel Chloride Batteries with NaSICON Solid Electrolyte," Journal of Electroanalytical Chemistry, vol. 759 (2015), pp. 201-206.
Zhao, Y. et al., "High-Performance Rechargeable Lithium-Iodine Batteries Using Triiodide/Iodide Redox Couples in an Aqueous Cathode," Nature Communications, vol. 4, 1896 (2013), 7 pages.
Small, L.J. et al., "Next Generation Molten NaI Batteries for Grid Scale Energy Storage," Journal of Power Sources, vol. 360 (2017), pp. 569-574.
Percival, S. et al., "Electrochemistry of the NaI—AlCl3 Molten Salt System for Use as Catholyte in Sodium Metal Batteries," Journal of the Electrochemical Society, vol. 165(14) (2018), pp. A3531-A3536.
Small, L.J. et al., "Electroless Process for Depositing Tungsten Metal for Sodium Battery Electrodes," No. SAND2016-9318C, Sandia National Labs (SNL-NM), Albuquerque, NM (US), 2016, 3 pages.
Gross, M.M. et al., "Low-temperature Molten Sodium Batteries," ACS Appl. Energy mater. 2020, vol. 3, pp. 11456-11462.
Gross, M.M. et al., Tin-based ionic chaperone phases to improve low temperature molten sodium-NaSICON Interfaces, J. Mater. Chem. A, 2020, vol. 8, pp. 17012-17018.
Zhao, Y. et al., "High-performance rechargeable lithium-iodine batteries using triiodide/iodide redox couples in an aqueous cathode," Nat. Commun. 4, 1896 (2013), 7 pages.
Spoerke, E.D. et al., U.S. Appl. No. 17/104,306, filed Nov. 25, 2020.

* cited by examiner

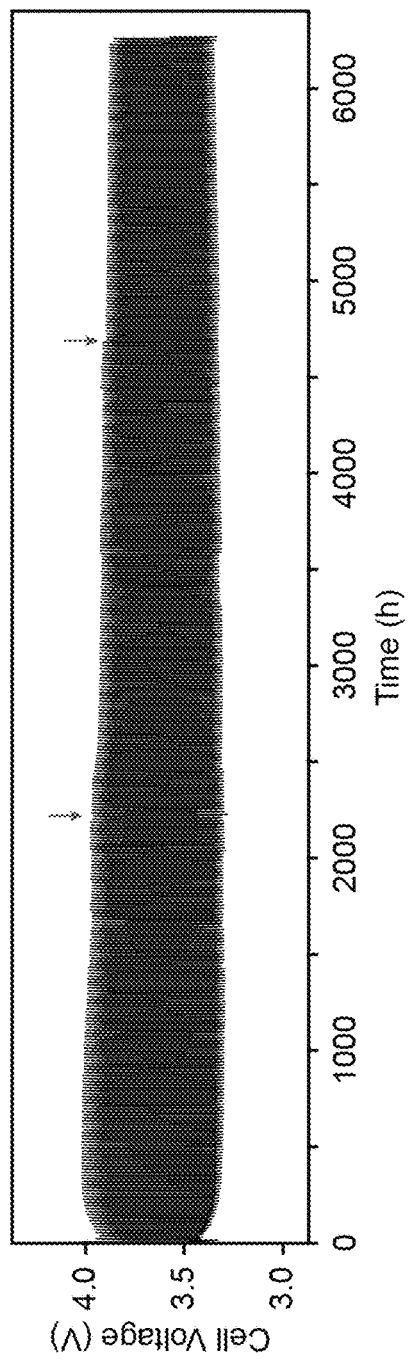
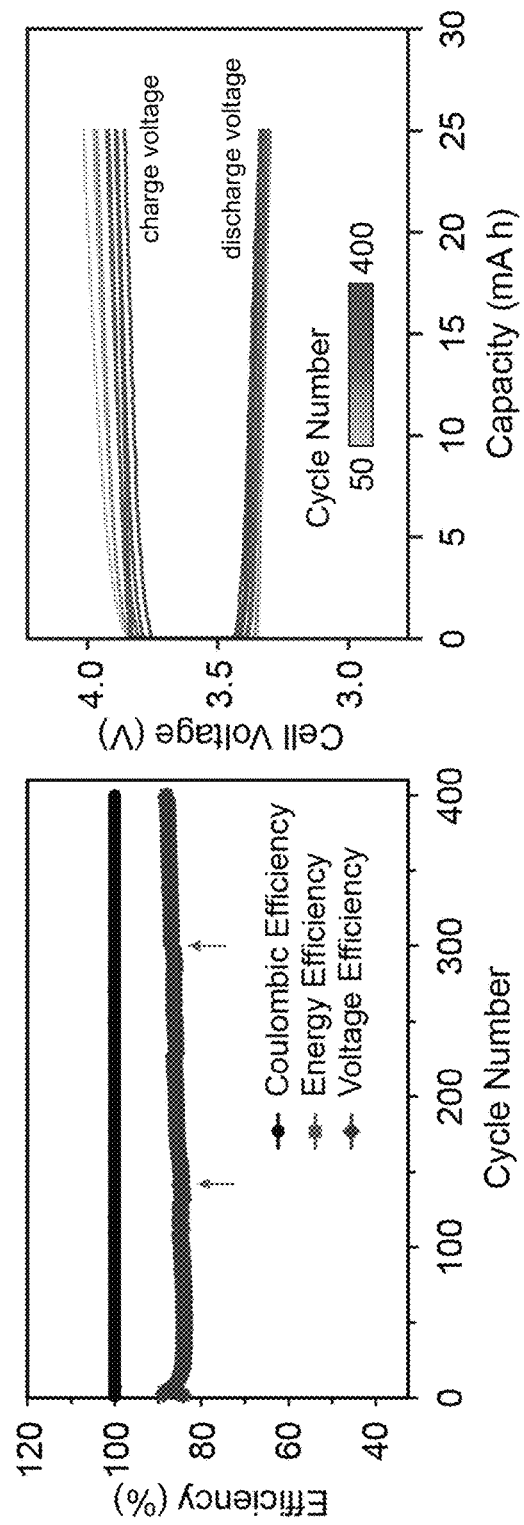
FIG. 3A
FIG. 3B
FIG. 3C

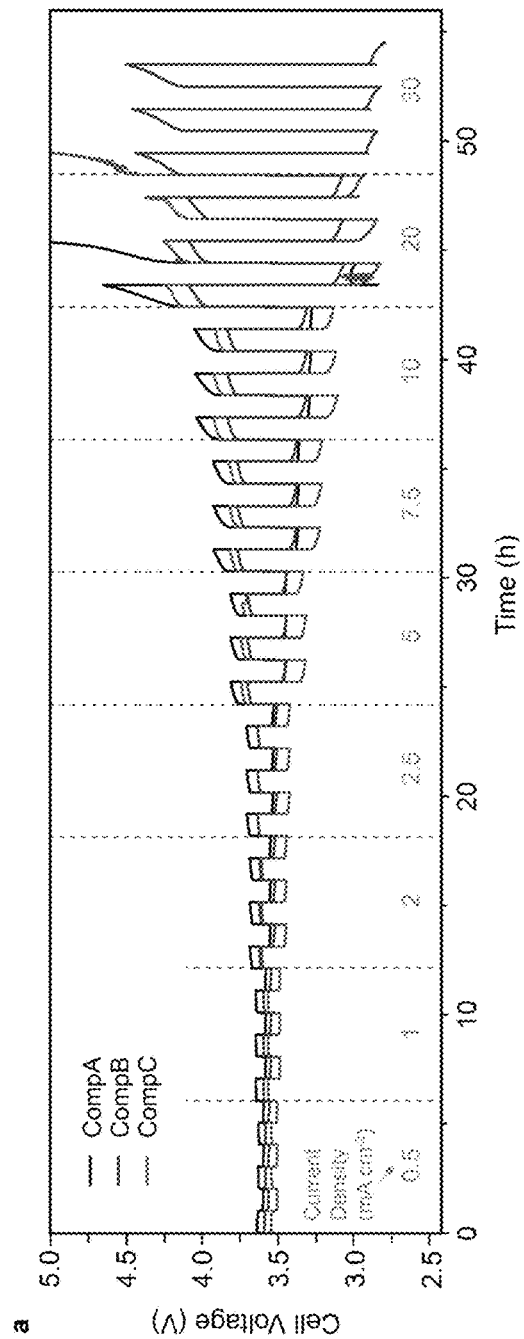
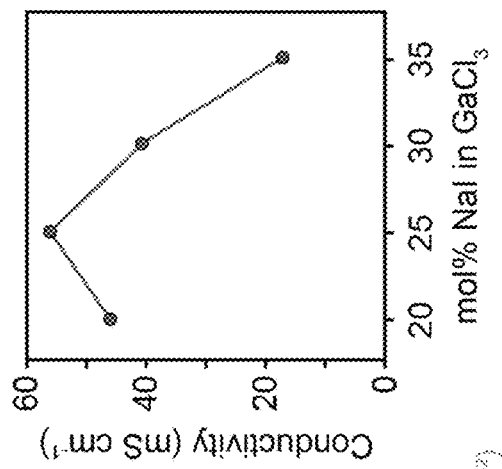
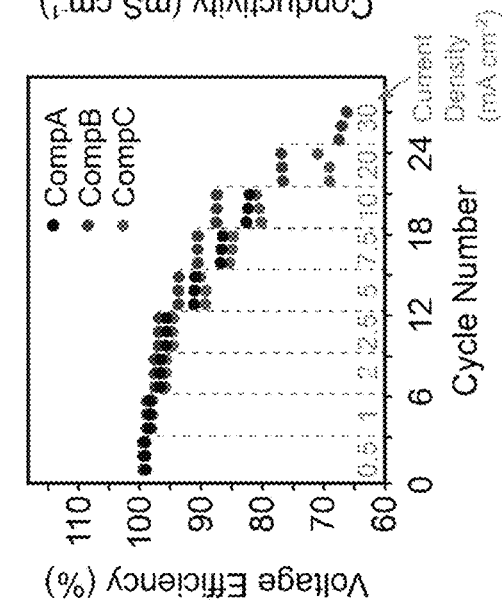
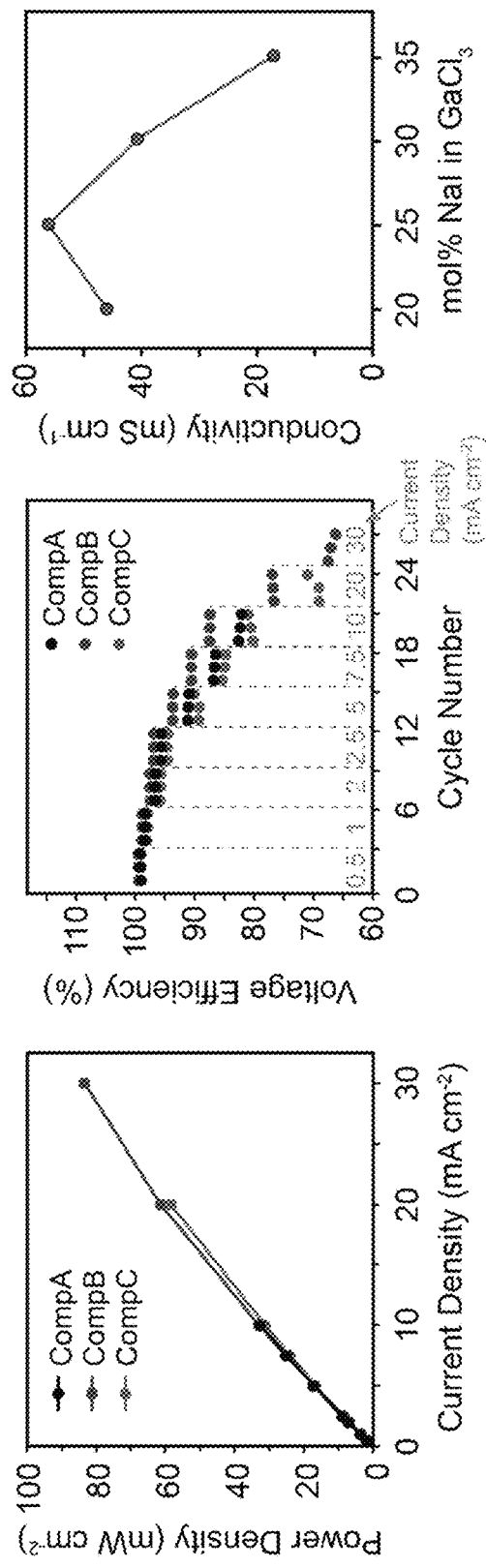
FIG. 7A
FIG. 7B
FIG. 7C
FIG. 7D

US 11,962,009 B1

LOW TEMPERATURE SODIUM BATTERY COMPRISING AN ELECTROCHEMICALLY ACTIVE MOLTEN INORGANIC CATHOLYTE

CROSS-REFERENCE TO RELATED APPLICATIONS

This application is a continuation-in-part of application Ser. No. 16/564,751, filed Sep. 9, 2019, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to molten alkali metal batteries and, in particular, to a low temperature molten sodium battery comprising an electrochemically active molten inorganic catholyte.

BACKGROUND OF THE INVENTION

Molten sodium batteries may be among the most important technologies needed to meet the rapidly growing need for economical, reliable, grid-scale electrical energy storage. These batteries take advantage of globally abundant sodium as the active materials in batteries that promise safe, high energy density, long-lifetime storage. See M. Aneke and M. Wang, *Appl. Energy* 179, 350 (2016); K. B. Hueso et al., *J. Nano Res.* 10, 4082 (2017); M. Chen et al., *Adv. Energy Mater.* 9, 1803609 (2019); and D. Larcher and J. M. Tarascon, *Nat. Chem.* 7, 19 (2015). Moreover, the knowledge base for large-format manufacturing of molten sodium batteries already exists, as both sodium-sulfur (NaS) and sodium-nickel chloride (Na—NiCl$_2$ or ZEBRA) batteries are in commercial production today. See G. Nikiforidis et al., *RSC Adv.* 9, 5649 (2019). Remarkably, though, as incorporation of storage on the grid continues to grow at a tremendous rate (e.g., storage in the U.S. is targeted to reach 100 GW by 2030), molten sodium batteries continue to be overlooked almost exclusively in favor of grid-adapted lithium-ion systems that are demonstrably less safe or reliable for many grid-scale applications. See R. M. Wittman et al., *J. Electrochem. Soc.* 167, 090545 (2020); and D. Rosewater and A. Williams, *J. Power Sources* 300, 460 (2015). The primary limitation is that traditional molten sodium batteries run hot (~270-350° C.), and hot batteries are expensive. Operating these batteries near 300° C. increases the costs of battery casings, insulation, wiring, and sealing materials. See B. L. Spatocco, Investigation of molten salt electrolytes for low-temperature liquid metal batteries, In: *Department of Materials Science and Engineering*, Massachusetts Institute of Technology (2015); H. J. Chang et al., *J. Power Sources* 348, 150 (2017); and Y. Jin et al., *Nat. Energy* 3, 732 (2018). Operational complexity and thermal management are more expensive at higher temperatures (it takes 15 hours to equilibrate a battery pack at 270° C.), and deleterious side reactions or material degradation processes are accelerated.

Conventional molten sodium batteries comprise a molten sodium anode, a ceramic solid-state separator (most commonly β"-Al$_2$O$_3$), and either a molten sulfur or a molten salt-based catholyte. While sodium metal melts at a modest 97.8° C., the separator performance and, critically, the catholyte chemistries in these traditional batteries require higher temperature operation. For example, although the sulfur in NaS batteries has a melting point of 115° C., the sodium polysulfide discharge products will solidify below 240° C., limiting sulfur redox kinetics and dramatically reducing battery performance. See T. Oshima and M. Kajita, *Int. J. Appl. Ceram. Technol.* 1, 269 (2004). Molten salt-based ZEBRA batteries utilize a solid cathode (Ni/NiCl$_2$) suspended in a molten salt electrolyte (NaAlCl$_4$). Although this class of batteries has been operated at temperatures below 200° C. in lab-scale demonstrations, functional current and power density requirements in commercial systems necessitate operation near 270-300° C. to enable rapid nickel redox kinetics as well as critical Na-wetting on the solid state separator and lower ionic resistance across the solid electrolyte. See H. J. Chang et al., *J. Power Sources* 348, 150 (2017). X. Lu et al., *J. Power Sources* 215, 288 (2012); G. Li et al., *J. Power Sources* 220, 193 (2012); X. Lu et al., *Nat. Commun.* 5, 4578 (2014); G. Li et al., *Adv. Energy Mater.* 5, 1500357 (2015); J. Kim et al., *J. Electroanal. Chem.* 759, 201 (2015); G. Li et al., *Nat. Commun.* 7, 10683 (2016); H.-J. Chang et al., *ACS Appl. Mater. Interfaces* 9, 11609 (2017); H.-J. Chang et al., *Adv. Mater. Interfaces* 5, 1701592 (2018); K. Jung et al., *J. Power Sources* 396, 297 (2018); X. Lu et al., *ACS Omega* 3, 15702 (2018); H.-J. Chang et al., *J. Mater. Chem. A* 6, 19703 (2018); D. Jin et al., *ACS Appl. Mater. Interfaces* 11, 2917 (2019); X. Zhan et al., *Adv. Energy Mater.* 10, 1903472 (2020); Y. Li et al., *Chem. Eng. J.* 387, 124059 (2020); and X. Zhan et al., *Energy Storage Mater.* 24, 177 (2020).

Creating highly functional lower temperature molten sodium batteries, therefore, requires overcoming issues of separator wetting at lower temperature, maintaining high conductivity in a solid-state separator, and most critically, identifying an electrochemically active catholyte capable of stable, high current density performance near or below the melting temperature of sodium. A number of attempts have been made to reduce the operating temperature of molten sodium batteries, and efforts over the past 10 years are concisely summarized in a recent report by Gross et al. See M. M. Gross et al., *ACS Appl. Energy Mater.* 3(11), 11456 (2020). The majority of these efforts are based Na—NiCl$_2$ or other metal halide systems operated between 175-200° C. Select demonstrations at lower temperatures have relied on potentially costly ionic liquids or potentially hazardous aqueous catholytes. See L.-P. Yang et al., *J. Power Sources* 272, 987 (2014); L. Xue et al., *Adv. Energy Mater.* 5, 1500271 (2015); J. S. Shamie et al., *Sci. Rep.* 5, 11215 (2015); and C. Liu and L. L. Shaw, *Batteries* 4, 60 (2018). The inherent safety and cycling stability of a fully inorganic, highly functional inorganic battery chemistry has yet to be realized in molten sodium batteries operated at such low temperatures (below 120° C.).

SUMMARY OF THE INVENTION

The present invention is directed to a low temperature sodium battery comprising an anode current collector, a sodium-based liquid metal anode, a nonporous Na$^+$-conducting separator, an electrochemically active inorganic molten salt catholyte comprising at least one sodium halide salt of the formula NaF, NaCl, NaBr, or NaI, and at least one gallium halide salt, and an inert cathode current collector. The sodium-based liquid metal anode can comprise molten sodium metal or an alloy of sodium and at least one other alkali metal. The catholyte can further comprise one or more metal halide salt of the formula $MX_y$, where M=Mg, Ca, Sr, Ba, Nb, Ta, Mo, W, Ga, In, Sn, Sb, or Bi, and X=F, Cl, Br, or I; and y is the number of halogen atoms in the metal halide salt. The catholyte can further comprise at least one aluminum halide salt of the formula $AlCl_3$, $AlBr_3$, or $AlI_3$. The catholyte can further comprise at least one weak Lewis acid, such as $Cl_2$, $Br_2$, or $I_2$. The catholyte can be fully liquid or at least partially liquid at a temperature less than 150° C. The catholyte can comprise less than 50 mol % sodium halide.

For example, mixing NaI with $GaCl_3$, or similar metal-halide salts, yields a liquid catholyte with a melting point less than 100° C. and redox-active $I^-$ concentrations of approximately 4.2 M for a 25 mol % NaI catholyte. This high $I^-$ concentration enables fast kinetics and theoretical energy densities of approximately 220 Wh/L. Moreover, the use of a liquid anode (sodium or sodium-alloy) avoids dendrite formation, while a liquid cathode (catholyte) precludes lifetime-limiting plating or intercalation reactions inherently limiting other commercialized chemistries. An inert solid phase cathode current collector can be used. The cathode current collector is not intentionally oxidized or reduced during battery operation; it simply provides or extracts electrons from the fully liquid catholyte. This is in contrast to many ZEBRA chemistries where the electrode (e.g. Ni, Zn, Fe) reacts with the electrolyte. A battery operating temperature of <150° C. enables use of inexpensive plastic seals, as opposed to welds, while the fully inorganic nature of the active battery components enhances safety by eliminating concerns of thermal runaway or explosion from flammable gas generation. This safe, inexpensive, energy dense chemistry offers a potentially long-lifetime energy storage solution.

BRIEF DESCRIPTION OF THE DRAWINGS

The detailed description will refer to the following drawings, wherein like elements are referred to by like numbers.

FIG. 3A is a voltage profile of long-duration cycling performance of a NaI—$GaCl_3$ battery assembled with a CathA catholyte, cycled at 5 mA cm$^{-2}$ and between 37.5-62.5% state of charge at 110° C. FIG. 3B is an efficiency profile. FIG. 3C is a capacity profile. Arrows denote when the battery was cooled to room temperature.

FIG. 6A is a graph of galvanostatic cycling of symmetric cells at increasing current densities. FIG. 6B is a graph of impedance spectra of anode symmetric cell measured after each cycle in FIG. 6A. FIG. 6C is a graph of impedance spectra of a catholyte symmetric cell measured after each cycle in FIG. 6A. FIG. 6D is a graph of area specific resistance (ASR) from the anode impedance spectra in FIG. 6B. FIG. 6E is the ASR from the catholyte impedance spectra in FIG. 6C.

FIGS. 7A-7D show electrochemical rate performance of NaI—$GaCl_3$ batteries with varying catholyte compositions. Compositions are detailed in Table 1. FIG. 7A is a graph of galvanostatic cycling of batteries with CathA, CathB and CathC catholyte compositions. FIG. 7B is a graph of power density curves calculated from FIG. 7A. FIG. 7C is a graph of voltage efficiencies calculated from FIG. 7A. FIG. 7D is a graph of conductivity of catholytes with compositions consisting of mol % NaI in $GaCl_3$ (no added $I_2$). All measurements were taken at a battery operating temperature of 110° C.

FIG. 8A is a graph of open circuit voltage measured during rest periods in GITT cycling, inset: full voltage profile. FIG. 8B is a representative voltage profile of current pulse-rest cycles on charge. FIG. 8C is a representative voltage profile on discharge. FIG. 8D is a graph of IR drop measured during initial application of current in GITT cycling. FIG. 8E is a graph of IR-corrected voltage change, $\Delta E_t$, during application of current in GITT cycling.

DETAILED DESCRIPTION OF THE INVENTION

Figure 1:
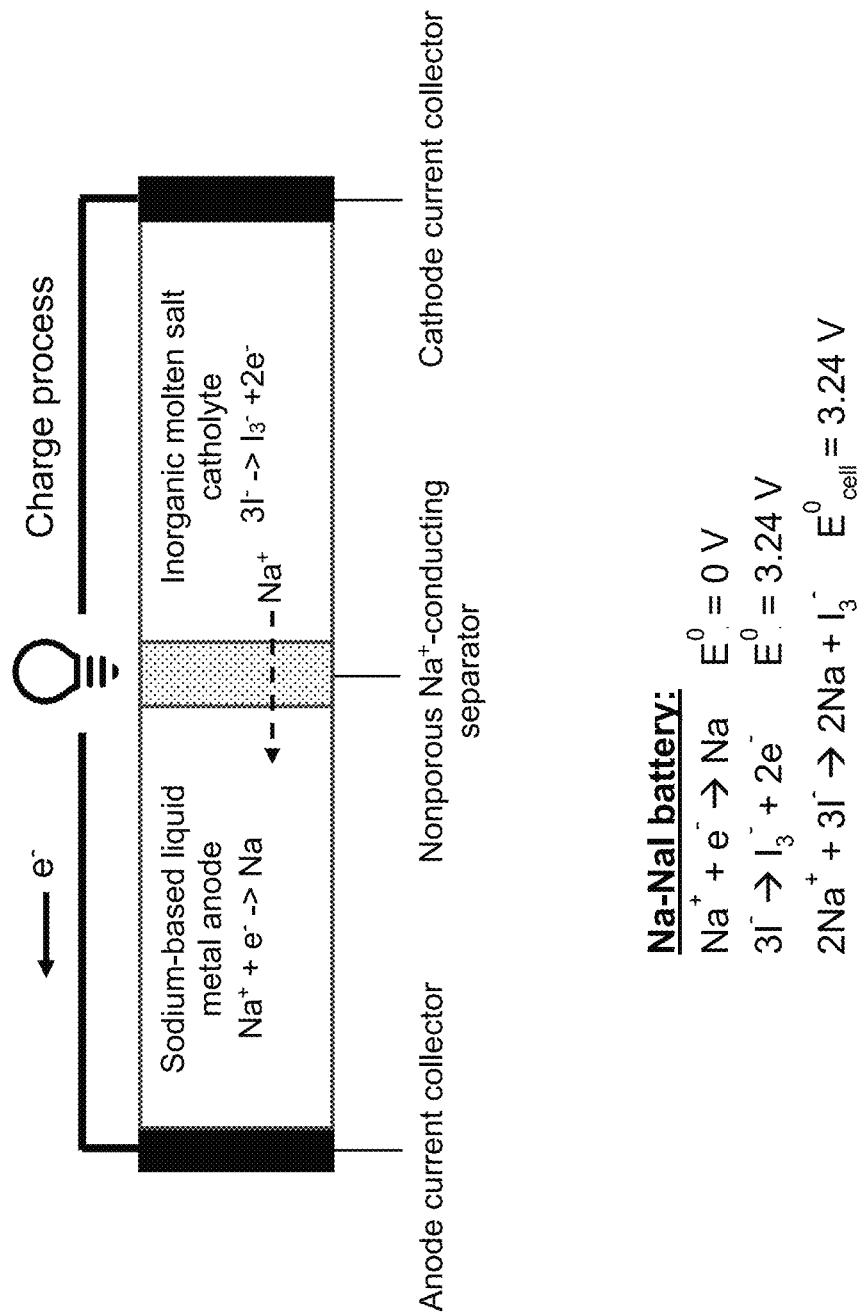
FIG. 1 is a schematic illustration of a molten sodium halide battery, with anode and cathode reactions and their standard state potentials during discharge.

A conceptual illustration of a molten sodium halide battery is shown in FIG. 1. The low temperature, inorganic molten sodium battery comprises a sodium-based liquid metal anode, a nonporous Na$^+$ conducting separator, an electrochemically active inorganic molten salt catholyte, and anode and cathode current collectors. Unlike previous sodium batteries which operate at a minimum of 120° C., and more practically 200° C., the present invention provides a molten sodium battery that can operate at <120° C. with a fully inorganic, electrochemically active catholyte.

The sodium-based liquid metal anode can comprise pure molten sodium metal or an alloy of sodium and other alkali metal(s), such as potassium or cesium. Other alloying metals, such as zinc, indium, or antimony, which reduce the melting temperature of the sodium alloy, can also be used. Liquid sodium is a preferable anode material, due to its high energy density, electrochemical reversibility, high electrical conductivity (105 S/cm), low melting point (98° C.), and earth abundance. See S. Ha et al., *Chem Phys Chem* 15, 1971 (2014); K. Hueso et al., *Energy Environ. Sci.* 6, 734 (2013); W.-L. Pang et al., *J. Power Sources* 356, 80 (2017); and F. Wan et al., *Nano Energy* 13, 450 (2015). Moreover, liquid metal anodes can avoid dendrite growth issues that plague solid zinc and lithium metal anodes. See X. Lu et al., *Nat. Commun.* 5, 4578 (2014).

The separator electrically isolates the two electrolytes (anode and cathode) and allows conduction of inert salt ions to maintain charge balance across the two electrolytes. Preferably, a zero-crossover separator selectively favors transport of the desired charge carrier, Na$^+$, and prevents transport of redox-active molecules and solvents that can contribute to capacity loss. The nonporous Na$^+$-conducting separator can comprise NaSICON (nominally $Na_{1+x}Zr_2Si_xP_{3-x}O_{12}$), $\beta''$-$Al_2O_3$, other solid Na$^+$ conductors, or a composite of these conductors and an inert component. In particular, NaSICON retains significant conductivity at temperatures <200° C. and is a mechanically robust ceramic separator that is stable against liquid sodium. See A. Jolley et al., *Ionics* 21, 3031 (2015); A. Jolley et al., *J. Amer. Ceram. Soc.* 98, 2902 (2015); X. Lu et al., *J. Power Sources* 195, 2431 (2010); X. Lu et al., *J. Power Sources* 215, 288 (2012); and J. Kim et al., *J. Electroanal. Chem.* 759, 201 (2015). The surface of the separator can comprise a coating capable of forming an intermetallic phase with sodium to address separator conductivity and wetting issues. See M. M. Gross et al., *J. Mater. Chem. A* 8, 17012 (2020); and U.S. application Ser. No. 17/104,306, filed Nov. 25, 2020, which are incorporated herein by reference.

The fully liquid, molten salt catholyte can comprise a sodium halide salt, such as NaF, NaCl, NaBr, or NaI, mixed with a gallium halide salt of the formula $GaX_3$, where X is a halogen, such as F, Cl, Br, or I. The catholyte can further comprise a metal halide salt of the formula $MX_y$, where M is an alkaline earth metal, such as Mg, Ca, Sr, or Ba; an early transition metal, such as Nb, Ta, Mo, or W; or a post-transition metal, such as In, Sn, Sb, or Bi; and y is the number of halogen atoms in the salt compound. The related numbers of metal cations and halogen anions in the salt compound are determined by the oxidation states of M and X and the fact that the total charge on the molecule must be zero. Exemplary salts include $MgX_2$, $CaX_2$, $TaX_5$, and $BiX_3$. The molten salt catholyte can comprise binary, ternary or quaternary mixtures of the above salts. The molten salt catholyte can further comprise an aluminum halide, such as $AlCl_3$, $AlBr_3$, or $AlI_3$. Any of the other metal halides can be added to the sodium halide/gallium halide mixture to help depress melting point or improve conductivity of the mixture. The mixture preferably comprises less than 50 mol % sodium halide. The molten salt catholyte can further comprise weak Lewis acids or molecular components, such as elemental halides $Cl_2$, $Br_2$, or $I_2$, that change the ratio of metal to halide.

As an example, the catholyte can make use of the reversible iodide/triiodide redox couple to store and release charge and which has been shown to have a high energy density. See Y. Zhao et al., *Nat. Commun.* 4, 1896 (2013). As shown in FIG. 1, upon charging $Na^+$ is drawn from the molten salt catholyte through the separator and reduced onto the molten sodium-based anode, while (for NaI-containing salts) a $I^-$-containing complex is oxidized via two-electron transfer to 13 in the molten salt catholyte. When discharging, $Na^0$ from the molten anode is oxidized to $Na^+$ and transported through the separator into the molten salt catholyte, while $I_3^-$ in the catholyte is reduced to $I^-$ at the cathode current collector. Depending on the chosen chemistry and operating temperature, operating voltages of 2.8-3.6 V are expected. See A. Bard and L. Faulkner, *Electrochemical Methods: Fundamentals and Applications*, second. Ed., Wiley (2000). This chemistry is unique from other sodium batteries which leverage inorganic molten salts, such as ZEBRA-style batteries, in that the cathode current collector does not react with the catholyte. Instead the cathode current collector merely oxidizes or reduces the catholyte during charging and discharging (i.e., extracts electrons from the fully liquid catholyte during charging and injects electrons into the catholyte during discharging). Thus, inert solid materials such as tungsten or graphite can be used for the cathode current collector, while electroactive materials such as Fe, Zn, or Ni can be avoided.

This invention improves on three key weakness of commercial batteries: cost, safety, and lifetime. Cost is greatly reduced by using sodium, instead of lithium used in industry-standard lithium-ion batteries. While systems such as sodium-sulfur have even lower materials costs, due to the lower cost of S vs. $I_2$, these systems operate near 300° C. and require extensive thermal management, and expensive hermetic sealing technologies. The low temperature operation of the molten sodium battery enables lower material and processing costs, reduced operation costs, and simplified heat management.

The safety of these batteries is attributed to the use of fully inorganic active components. Upon simulated internal discharge of a higher operating temperature $GaCl_3$—NaI cathode, only aluminum metal and a harmless sodium halide salt (e.g. NaCl) was formed, along with minimal heat and no recordable gas evolution. Thus, these fully inorganic active components eliminate concerns of explosion from buildup of flammable gases and the creation of a thermal runaway event. With improved safety, larger cells necessary for grid-scale storage can be fabricated, enabling further cost reductions and increasing ease of cell-level integrated power management.

Finally, the low temperature molten sodium battery offers improved lifetime, due to reduced material degradation, decreased reagent volatility, and fewer side reactions. The use of fully liquid reactions precludes dendrite formation in the anode and eliminates plating or intercalation reactions in the cathode. Elimination of these failure mechanisms, common in Li-ion and Zn—$MnO_2$ batteries, is expected to lengthen Na battery lifetime beyond 10,000 cycles and drive down the levelized cost of operation. Such long cycle life is necessary for reliable grid scale storage applications.

Example: NaI—$GaCl_3$ Catholyte

Molten sodium batteries paired with a molten salt catholyte utilizing NaI as a redox-active material have shown promise in reduced temperature demonstrations, particularly at intermediate temperatures. See L. J. Small et al., *J. Power Sources* 360, 569 (2017). In these batteries, a molten sodium anode is separated from a fully inorganic molten salt catholyte by a NaSICON solid electrolyte separator. Oxidation and reduction of the sodium is balanced by the reduction and oxidation of iodide/triiodide in the molten salt catholyte, yielding a voltage considerably higher than the 2.58 V common to traditional molten salt (ZEBRA) batteries.

$$\text{Anode: } Na^+ + e^- \rightarrow Na \quad E^0 = -2.71 \text{ V vs. } SHE \tag{1}$$

During charging, the cathode reaction can be broken into two parts: an electrochemical reaction (2), and a chemical reaction (3):

$$2I^- \rightarrow I_2 + 2e^- \tag{2}$$

$$I^- + I_2 \leftrightarrow I_3^- \tag{3}$$

As the equilibrium constant for reaction (3) is quite high, it is generally regarded that there is little free $I_2$ in the presence of excess $I^-$. See G.-M. Weng et al., *Energy & Environmental Science* 10, 735 (2017). As a result, the cathode reaction is typically written as:

$$\text{Cathode: } 3I^- \rightarrow I_3^- + 2e^- \quad E^0 = 0.53 \text{ V vs. } SHE \tag{4}$$

$$\text{Full Cell: } 2Na^+ + 3I^- \rightarrow 2Na + I_3^- \quad E^0_{cell} = 3.24 \text{ V vs. } SHE \tag{5}$$

The triiodide ion can be further oxidized at higher potentials to form $I_2$ per the reaction:

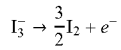

$$I_3^- \rightarrow \frac{3}{2}I_2 + e^- \quad (6)$$

This system was first introduced with a NaI—AlCl$_3$ catholyte which was capable of long-term cycling at an intermediate temperature of 180° C. See L. J. Small et al., *J. Power Sources* 360, 569 (2017). Significantly reducing this temperature, however, led to the formation of solid products in the catholyte that were believed to impair battery performance. See S. J. Percival et al., *J. Electrochem. Soc.* 165, A3531 (2018). It has recently been shown that a substitution of the anion in the molten salt electrolyte, using AlBr$_3$ in place of AlCl$_3$, lowered the catholyte melting temperature to 97.5° C., near the melting temperature of sodium. See M. M. Gross et al., *ACS Appl. Energy Mater.* 3(11), 11456 (2020). With this adapted catholyte, it was possible to cycle a molten sodium battery over 200 times at 110° C. Unfortunately, side reactions between the NaI—AlBr$_3$ catholyte and limited iodide redox kinetics restricted these batteries to low current densities of 0.5 mA cm$^{-2}$ and low capacity limits (1% total capacity) in long-term cycling studies.

According to an embodiment of present invention, low-temperature molten sodium battery performance can be improved using a NaI—GaCl$_3$ catholyte in place of, or in addition to, the AlCl$_3$ or AlBr$_3$-based catholytes to achieve cycling at current densities up to 30 mA cm$^{-2}$ with a nominal voltage of 3.65 V. The fully inorganic, molten salt-based sodium-sodium iodide (Na—NaI) battery chemistry enables exceptional cycling behavior in a 3.65 V battery at a dramatically reduced operating temperature of 110° C. Compared with conventional molten salt-based systems, such as ZEBRA batteries, this catholyte provides a 40% increase in battery voltage with a decrease in temperature of 160° C., showing promise toward a revolutionary new molten sodium battery technology.

Long-Duration Cyclability at Low Operating Temperature

Figure 2:
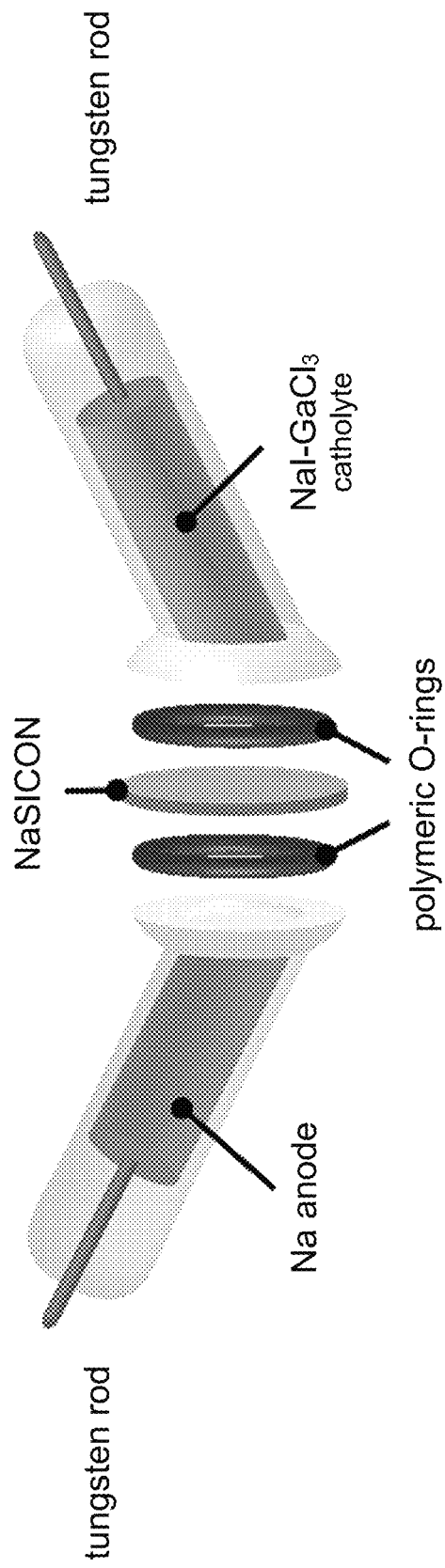
FIG. 2 is a schematic illustration of an experimental molten sodium/NaI—$GaCl_3$ battery assembly.

As an example of the invention, a 100-mA h molten sodium battery was assembled with a NaI—GaCl$_3$ catholyte for long-duration cycling at the low temperature of 110° C. All battery capacities were determined based on reaction (5), with $I_3^-$ as the reaction product unless otherwise noted. As shown in FIG. 2, the exemplary battery consisted of a Sn-saturated Na anode, a Sn-coated NaSICON separator, NaI—GaCl$_3$ catholyte, and thermally activated carbon felt cathode current collector. The NaSICON separator pellets were coated with a 170 nm Sn coating on sides facing Na metal. See M. M. Gross et al., *J. Mater. Chem. A* 8, 17012 (2020); and U.S. application Ser. No. 17/104,306, filed Nov. 25, 2020. Polymeric O-rings were used to seal the battery contents in glass cell chambers containing hermetically sealed tungsten rod current collectors. The catholyte contained NaI, GaCl$_3$, and for partial charge assemblies, $I_2$. Catholyte compositions are listed in Table 1. Any $I_2$ added on battery assembly (compositions CathA, CathB, and CathC) is assumed to complex with $I^-$ to form $I_3^-$, per reaction (3) due to the presence of excess $I^-$. State of Charge (SOC) determination of the battery was calculated based on reaction (5). The long-duration cyclability testing described below used CathA catholyte.

TABLE 1

Composition of battery catholytes, by molar ratio of compounds mixed during battery assembly.

| Composition ID | Molar Ratio of Components in Battery Assembly | | | Battery Assembly |
|---|---|---|---|---|
| | GaCl$_3$ (mol) : | NaI (mol) : | I$_2$ (mol) | SOC (%) |
| CathA | 75 | 18.75 | 3.125 | 37.5 |
| CathB | 70 | 22.5 | 3.75 | 37.5 |
| CathC | 65 | 26.25 | 4.375 | 37.5 |
| CathD | 75 | 25 | 0 | 0 |

The exemplary battery was cycled at 25% depth of discharge, which corresponds to cycling between 37.5 and 62.5% SOC, at 5 mA cm$^{-2}$. This window was chosen owing to the low voltage losses in this cycling regime. After a volatile first cycle, battery performance was incredibly stable as can be seen in FIG. 3A. The battery was cycled for over 6000 h (>8 months) and 400 cycles with no obvious degradation in the voltage profile or battery efficiencies. Remarkably, battery performance improved during cycling, increasing from a lowest energy efficiency of 84.0% to 88.3% on the last cycle, as shown in FIG. 3B. As the battery was cycled to 100% coulombic efficiency, the voltage and energy efficiencies are the same. The stability of the voltage profile is further highlighted in FIG. 3C, which shows the capacity profile of the battery (every 50 cycles shown). Overpotential on charge and discharge decreased during cycling, with a more obvious drop in overpotential occurring on charge, resulting in the increasing battery energy efficiency. The battery achieved an average discharge voltage of 3.34 V and average charge voltage of 3.90 V over 400 cycles. Overall performance was very steady at these intermediate current density and depth of discharge cycling parameters. Throughout cycling, the battery cycling program was periodically stopped for a few hours to accommodate other experiments in the shared oven space. This periodic stoppage appears to have had little effect on the battery performance, as seen by a less than 0.5% average drop in energy efficiency in the cycle following the stoppage which would be recovered within a few cycles. Moreover, the batteries were twice cooled to room temperature, first for a month and second for a week. These stoppages are marked in FIGS. 3A and 3B by arrows. The ability to freeze the charged battery and discharge it at a later time is especially advantageous for long duration grid-scale energy storage, where a battery might be charged during one month, and then discharged several months later.

Characterization of NaI—GaCl$_3$ Catholyte

Figure 4:
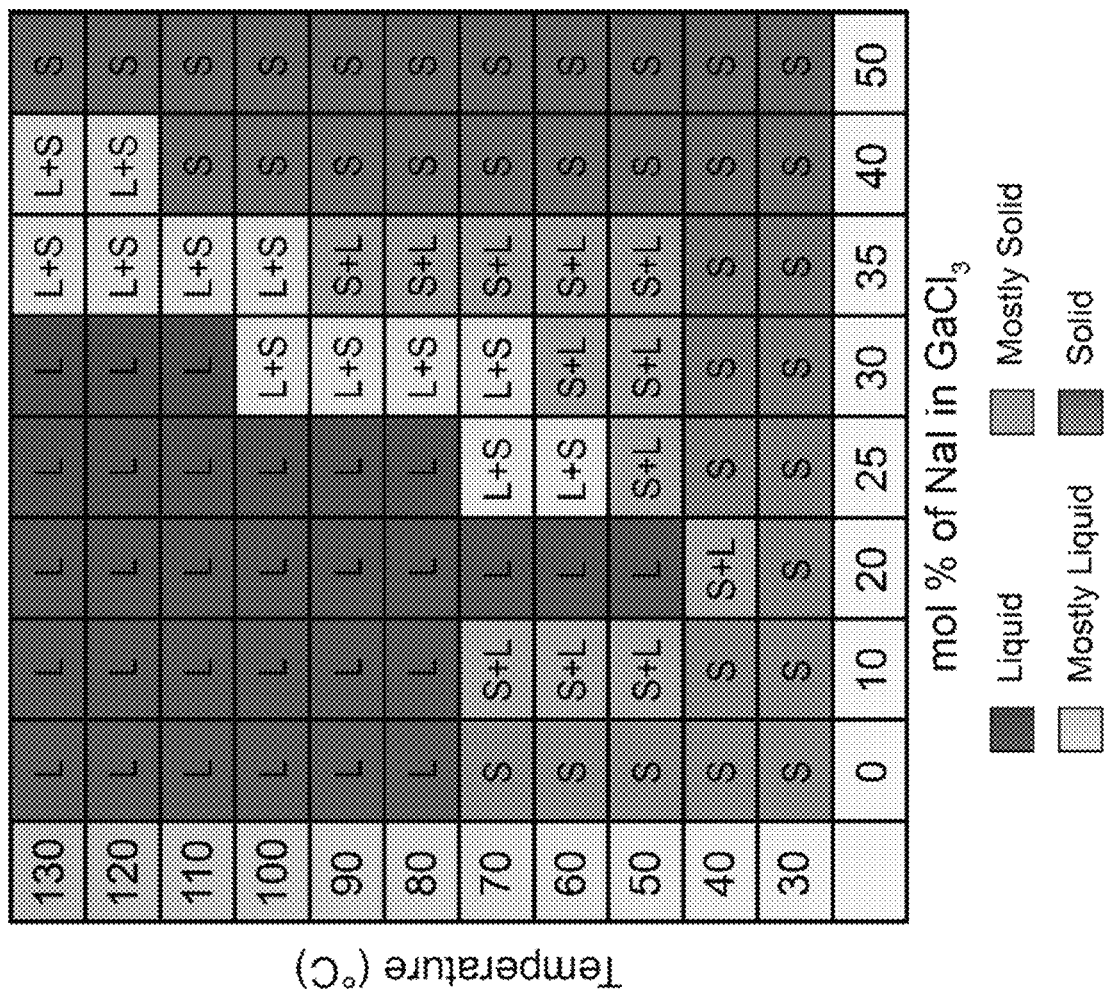
FIG. 4 is a qualitative phase diagram of NaI—$GaCl_3$ solutions with no $I_2$ added.

As shown in FIG. 4, a qualitative phase diagram was created to determine compositions of NaI—GaCl$_3$ which remain fully molten at temperatures of interest. The phase diagram was obtained by visual observation of salts of different compositions at the desired temperatures. Further information about the compositions is shown in Table 2. Previous work with a molten sodium battery based on a AlCl$_3$ catholyte had shown great success, but had been limited to 180° C. to obtain good performance. See L. J. Small et al., *J. Power Sources* 360, 569 (2017). AlBr$_3$ and GaCl$_3$ were salts that could logically be used to replace the AlCl$_3$, based on Lewis acidity and electronic structure, coupled with their lower melting points (m.p.): AlCl$_3$ 192.4° C. m.p., AlBr$_3$ 97.5° C. m.p., GaCl$_3$ 77.9° C. m.p. As previously discussed, redox kinetics of NaI in AlBr$_3$ proved to be sluggish, so it was hypothesized that substitution of $GaCl_3$, which is similar to $AlCl_3$ in organic chemistry syntheses, would shift the liquid regions of the phase diagram of the NaI catholyte to significantly lower temperatures while providing a similar chemical bonding environment that would maintain the high performing redox behavior of $I^-/I_3^-$ observed in the NaI—$AlCl_3$ system. See R. Amemiya and M. Yamaguchi, *Eur. J. Org. Chem.* 2005, 5145 (2005). A single-phase liquid catholyte was achievable at compositions up to 30 mol % NaI in $GaCl_3$ and down to temperatures below the melting point of sodium. Note that the phase diagram was obtained for catholyte compositions without added $I_2$, as the presence of $I_2$ turned salts deep purplish brown that made visual inspection to identify solid phases difficult, even at low concentrations of $I_2$ (in the form of $I_3^-$, per reaction (3)). Owing to the wide range of catholyte compositions that maintained a fully liquid state, an operating temperature of 110° C. was chosen for all electrochemical testing.

TABLE 2

Composition of catholytes used in qualitative phase diagram and conductivity testing, as mol % of individual species. Note that species are based on input compound ($GaCl_3$, NaI) and does not account for potential unknown complexation reactions. For example, CathD in Table 1 corresponds to 25 mol % NaI in $GaCl_3$.

| Mol % NaI in $GaCl_3$ | Mol% of Species in Battery Catholyte | | | |
|---|---|---|---|---|
| | $Ga^{3+}$ | $Cl^-$ | $Na^+$ | $I^-$ |
| 0 | 25 | 75 | 0 | 0 |
| 10 | 23.68 | 71.05 | 2.63 | 2.63 |
| 20 | 22.22 | 66.67 | 5.56 | 5.56 |
| 25 | 21.43 | 64.29 | 7.14 | 7.14 |
| 30 | 20.59 | 61.76 | 8.82 | 8.82 |
| 35 | 19.70 | 59.09 | 10.61 | 10.61 |
| 40 | 18.75 | 56.25 | 12.50 | 12.50 |
| 50 | 16.67 | 50 | 16.67 | 16.67 |

Figure 5:
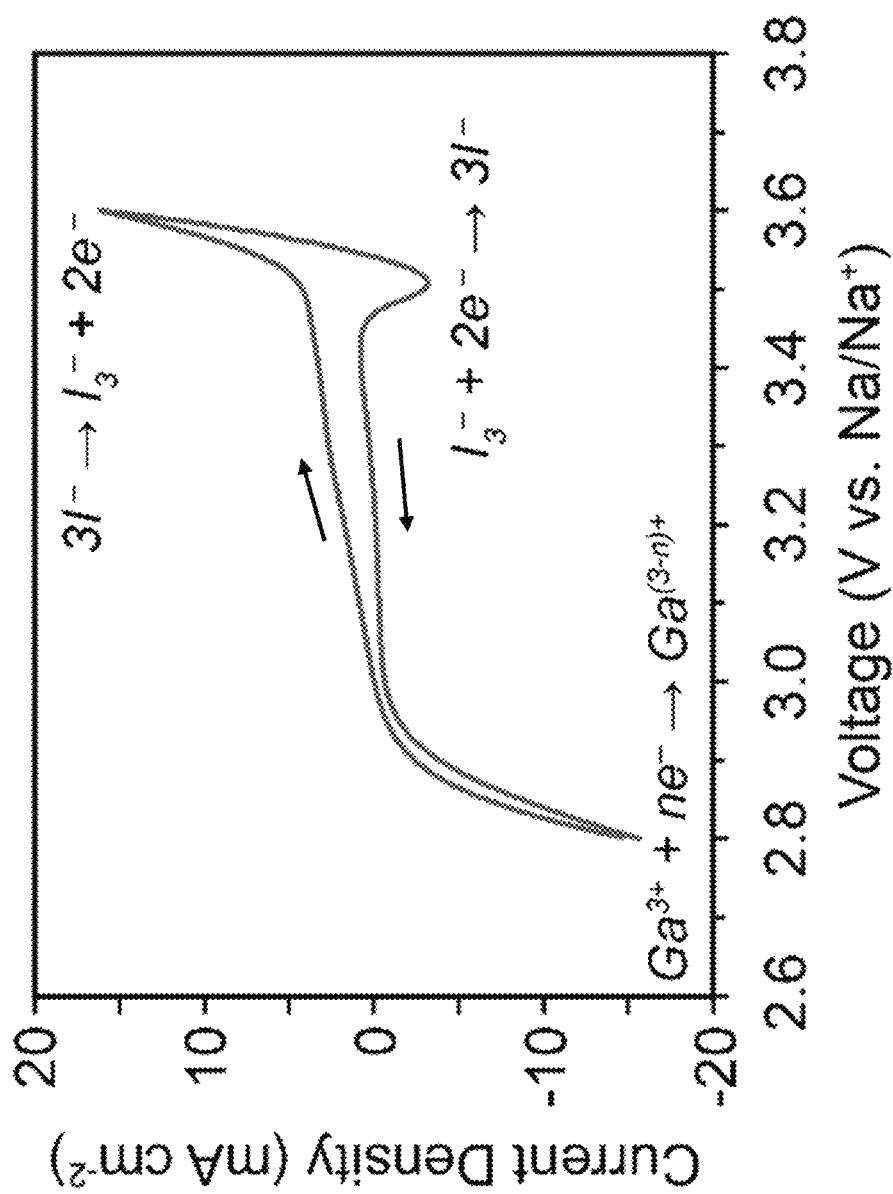
FIG. 5 is a cyclic voltammogram of CathD catholyte at 10 mV s$^{-1}$ and 110° C.

After determination of desirable catholyte compositions, the initial electrochemical behavior of the $GaCl_3$ catholyte was probed by performing cyclic voltammetry (CV) using a three-electrode cell. FIG. 5 shows a representative CV scan of a NaI—$GaCl_3$ CathD catholyte using a graphite electrode. The CV displays features that are consistent with the expected $I^-$ electrochemical reactions, where above 3.4 V there is a large increasing current wave observed, corresponding to the oxidation of $I^-$ to $I_3^-$ on the forward scan and the reduction of the electrochemically produced $I_3^-$ back to $I^-$ on the reverse scan. As lower potentials are applied on the reverse scan, the reduction of $Ga^{3+}$ in the melt can be observed starting near 2.9 V, with the corresponding oxidation observed as a slight wave in the positive scan direction starting at~3.1 V. The formation of $Ga^+$ or even $Ga^{2+}$ has been observed in different electrolyte systems and is possibly occurring here. See P.-Y. Chen et al., *J. Electrochem. Soc.* 146, 3290 (1999); and Y. Chung and C.-W. Lee, *J. Electrochem. Sci. Technol.* 4, 1 (2013). No obvious metallic deposits were observed, and given that the standard reduction potential of $Ga^{3+}$ to Ga metal is ~2.2 V (vs. $Na/Na^+$), it is unlikely that Ga metal is forming during discharge.

The detrimental effects of electrolyte decomposition by $Ga^{3+}$ reduction was confirmed by the over-discharge of 150 mA h capacity full cells. Batteries were assembled with CathD catholyte and briefly charged at 0.75 mA $cm^{-2}$ to 1% SOC to generate a small amount of $I_3^-$ and establish a baseline electrochemical plateau for the $I^-/I_3^-$ reaction. The battery was then over-discharged by discharging past the expected capacity based on the $I_3^-$ generated during the preceding 1% SOC charge step. On discharge, batteries demonstrated two plateaus, with the lower voltage plateau corresponding to $Ga^{3+}$ reduction. The reduction of $Ga^{3+}$ appears to be only partially reversible, as evidenced by the low current of the oxidation wave in FIG. 5 and the low coulombic efficiency of the reaction in full cell cycling. Electrolyte decomposition, in addition to causing battery failure, can potentially release $Cl_2$ and for these reasons a lower voltage limit of 2.9 V was established for galvanostatic cycling of batteries at current densities less than 5 mA $cm^{-2}$, and 2.5 V for current densities above 5 mA $cm^{-2}$ to accommodate for additional IR losses. These limits were established as a precaution and were rarely reached, with nearly all cycles first reaching the time limit.

Evaluation of Battery Component Performance

Figure 6A:
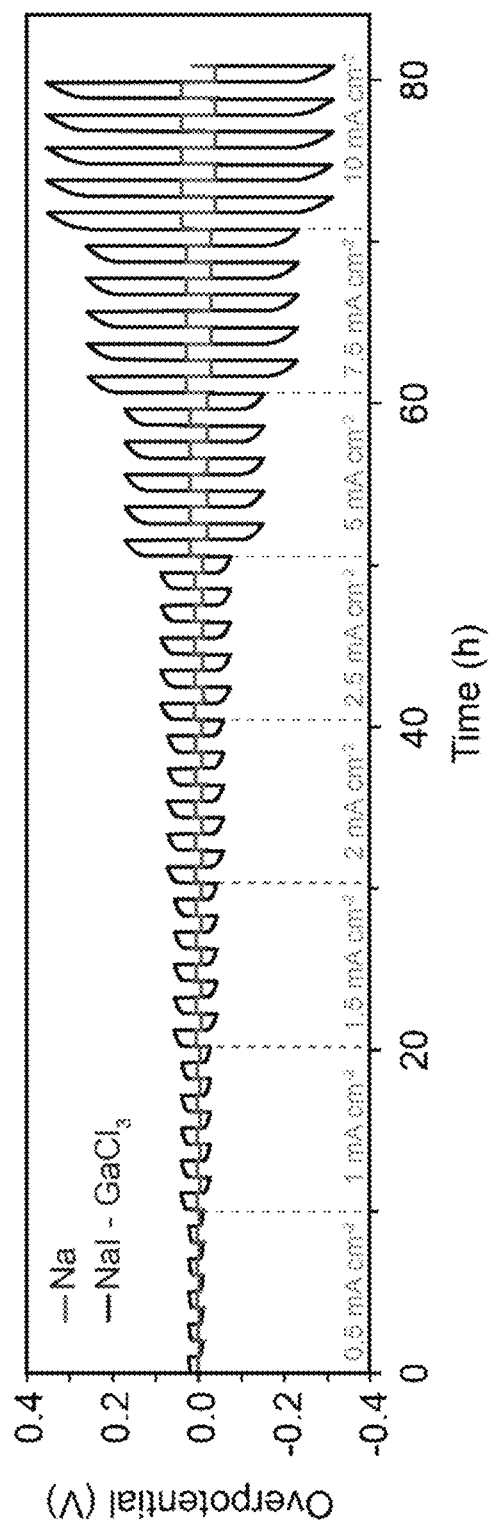
FIGS. 6A-6E show the electrochemical behavior of anode (Na) and catholyte (NaI—$GaCl_3$) symmetric cells at 110° C.

The performance of the anode and the catholyte were initially decoupled by studying the performance of symmetric cells. Symmetric cells were assembled and cycled at increasing rates from 0.5 mA $cm^{-2}$ to 10 mA $cm^{-2}$ for 1 h charge and discharge cycles, for 5 cycles at each current density. The impedance of the battery was measured after each cycle. Symmetric anode cells with W rod current collectors were assembled with Sn-saturated Na and a NaSICON separator coated on both sides with 170 nm of Sn. Symmetric catholyte cells were assembled with CathA catholyte on each side, with a bare NaSICON separator and thermally activated carbon felt current collectors. As can be seen in FIG. 6A, symmetric cells containing only NaI—$GaCl_3$ catholyte demonstrate a substantially higher overpotential compared to Na anode symmetric cells, achieving an overpotential of 355 mV at 10.0 mA $cm^{-2}$, compared to anode symmetric cells which had an overpotential of 39.0 mV at 10.0 mA $cm^{-2}$. This indicates that the main source of resistance in the battery can be attributed to the catholyte, not the anode (or NaSICON separator). This is further reflected in impedance data. After completing cycling, the anode symmetric cell had a total area specific resistance (ASR) of 10.7 $\Omega \cdot cm^2$, while the catholyte symmetric cell had an ASR of 75.3 $\Omega \cdot cm^2$.

Figures 6B, 6C:
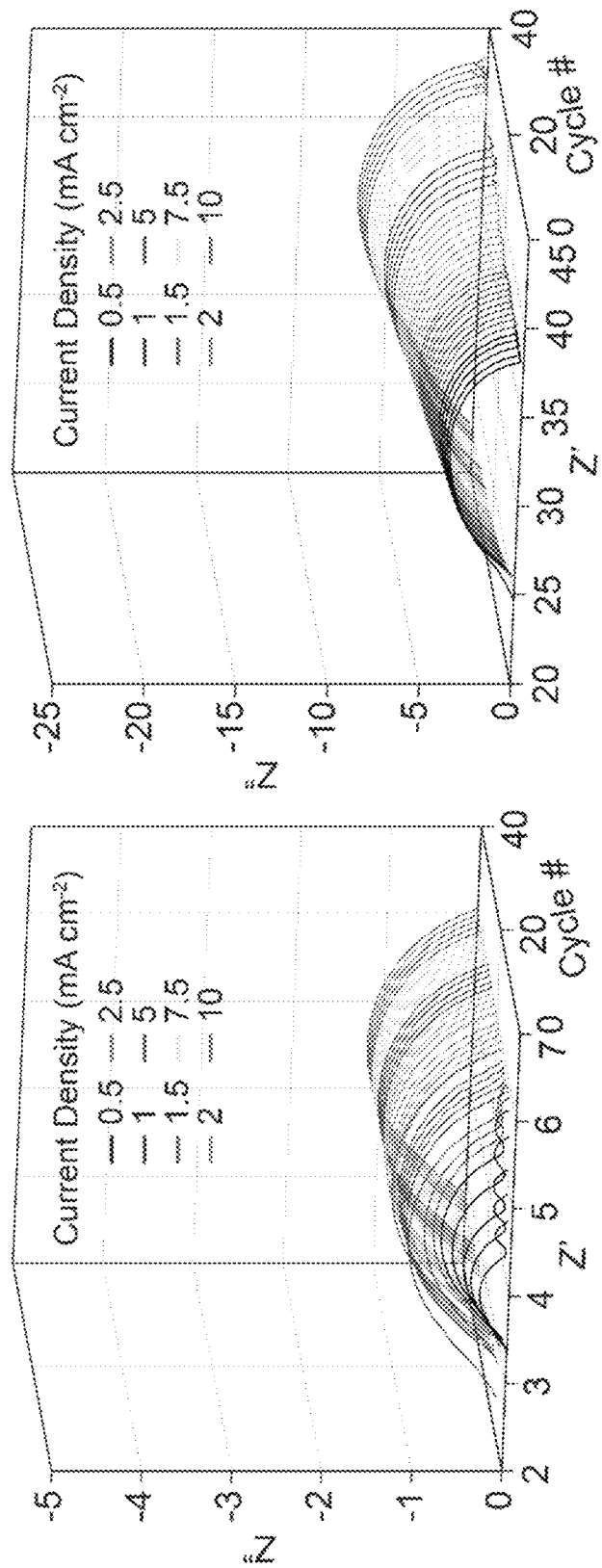
Figure 6E:
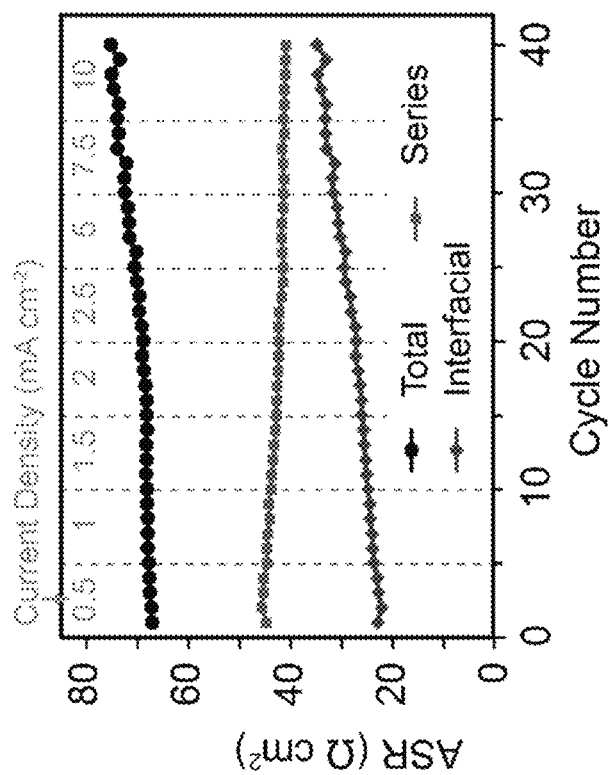
Figure 6D:
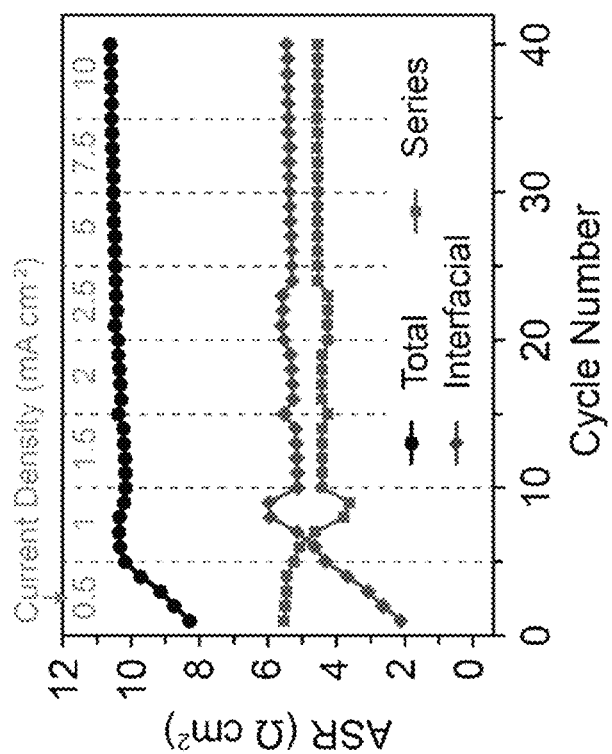

FIGS. 6B and 6D show the evolution in the impedance and ASR of the anode symmetric cell with increasing cycling and current density. FIG. 6B reveals the evolution of the impedance curve during cycling at low current densities. In initial cycling at 0.5 mA $cm^{-2}$, the impedance displays two semicircles, one at high frequency and one at low frequency. With cycling, the high frequency semicircle grows while the low frequency semicircle shrinks, eventually being completely consumed. By the completion of 10 cycles (5 cycles at 0.5 mA $cm^{-2}$ and 5 cycles at 1 mA $cm^{-2}$), the impedance is largely done evolving and minimal changes occur to the curve with subsequent cycling. The ASR measured in the anode symmetric cell, shown in FIG. 6D, shows that the interfacial resistance, attributable to resistance to charge transfer at the sodium-coating and coating-NaSICON interfaces (5.8 $\Omega \cdot cm^2$ after cycling completed), dominates over the series resistance (4.9 $\Omega \cdot cm^2$ after cycling completed). Series resistance can be attributed to resistances within the coating and NaSICON, as well as other materials such as the sodium and W current collectors. Previous work on the use of a Sn coating on NaSICON in molten sodium batteries suggested the in-situ formation of a NaSn intermetallic phase during cycling. See M. M. Gross et al., *J. Mater. Chem. A* 8, 17012 (2020). The evolution of the impedance curve is likely a reflection of this phase formation. In contrast, the catholyte symmetric cell undergoes no dramatic evolution in its impedance curve, demonstrating a single semicircle throughout cycling (FIG. 6C) and exhibiting a linear increase in the interfacial resistance (FIG. 6E).

Due to the evolution of the anode symmetric cell impedance data in its initial cycles at low current density, full cells were probed for the necessity of pre-conditioning steps to cycle batteries at higher current densities. Pre-conditioning consisted off cycling full cells at increasing rates of 0.5 mA cm$^{-2}$ to 10 mA cm$^{-2}$ for 1 hr charge and discharge cycles, for 5 cycles at each charge density. Current densities cycled were 0.5, 1.0. 1.5. 2.0, 2.5, 5.0, 7.5, and 10 mA cm$^{-2}$. Batteries cycled at 10 mA cm$^{-2}$ with no pre-conditioning exhibited a high overpotential, hitting the upper cycling voltage limit of 4.7 V on the first charge and rapidly failing. In contrast, those that underwent pre-conditioning steps before galvanostatic cycling at 10 mA cm$^{-2}$ demonstrate substantially steadier performance. Therefore, pre-conditioning batteries at low current densities is desirable for good performance at high current densities. The sharp peak seen in the voltage profile of the non-conditioned cell is characteristic of a poor Na-NaSICON interface in symmetric cells, and likely indicates that the evolution of the anode during preconditioning to establish a good Na-NaSICON interface reduces battery overpotential at high current densities. See M. M. Gross et al., *J. Mater. Chem. A* 8, 17012 (2020).

Evaluation of Battery System Performance

Power performance of these exemplary batteries was evaluated by galvanostatic cycling of full cells at increasing rates from 0.5 mA cm$^{-2}$ to 30.0 mA cm$^{-2}$ to determine the maximum current density achievable with the NaI—GaCl$_3$ system, based on fully or nearly fully molten catholyte compositions with a high NaI content to maximize catholyte capacity. Catholytes of composition CathA, CathB, and CathC were tested. Batteries were charged and discharged for 1 h at each current density for 3 cycles with an upper voltage limit of 5 V. It was found that batteries assembled with CathB catholyte exhibited the best power performance, capable of achieving up to an ultra-high current density of 30.0 mA cm$^{-2}$ before battery failure, as shown in FIG. 7A. Cells with CathC catholyte composition could be cycled up to 20.0 mA cm$^{-2}$, and CathA catholyte could be cycled up to 10.0 mA cm$^{-2}$. This is reflected in the power density achieved by each of the catholyte compositions. As shown in FIG. 7B, the CathB catholyte achieved a maximum power density of 83.5 mW cm$^{-2}$, the CathC catholyte achieved 58.4 mW cm$^{-2}$, and the CathA catholyte achieved 32.7 mW cm$^{-2}$. Interestingly, although it was unable to cycle at the higher current density, the CathA catholyte showed superior performance to the CathC catholyte. As shown in FIG. 7C, at 10.0 mA cm$^{-2}$ the CathB catholyte cell had a voltage efficiency (VE) of 87.3%, while the CathA cell had a VE of 82.0% and CathC cell had a VE of 80.9%. As shown in FIG. 7D, in measuring the conductivities of the catholytes with no added I$_2$ (mol % NaI in GaCl$_3$ only, Table 2), it can be seen that there is a local maximum near 25 mol % NaI in GaCl$_3$ (CathD battery catholyte composition). Though the presence of I$_3^-$ (from the I$_2$ added during assembly) in the catholyte potentially obscures correlations, it is possible that a CathA catholyte would have a lower conductivity than a CathB catholyte based on the mol % of free I$^-$ (not complexed as I$_3^-$, per Tables 1 and 2). This seems reasonable as based on size, the conductivity of the I$_3^-$ anion can be presumed to be much lower than the conductivity of the I$^-$ anion. See W. C. Bray and G. M. J. MacKay, *J. Amer. Chem. Soc.* 32, 914 (1910); and G. Hoshen, *Synthesis and Reactivity in Inorganic and Metal-Organic Chemistry* 18, 275 (1988). Based on the qualitative phase diagram in FIG. 4, it is possible that solid products form in the CathC catholyte, inhibiting salt conductivity and causing a drop in VE. Overall, this shows that an optimized NaI—GaCl$_3$ catholyte is capable of cycling at ultra-high current densities at depths of discharge up to 10%.

Figure 8A:
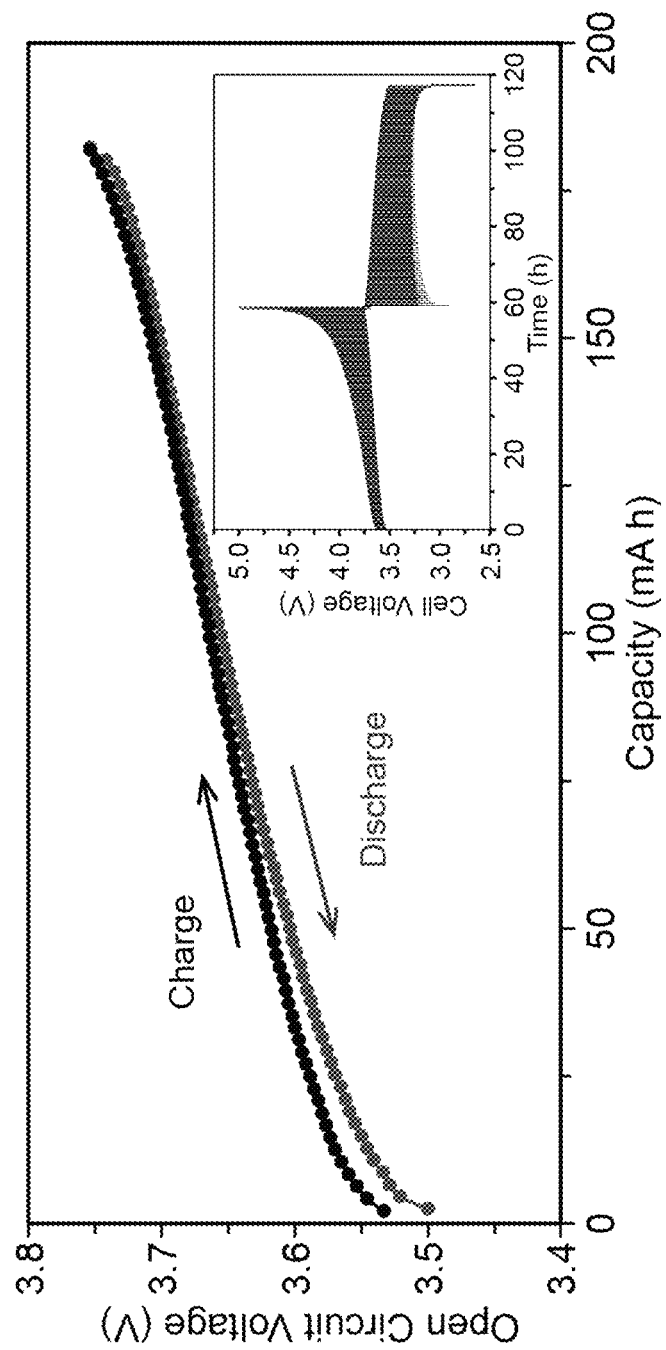
FIGS. 8A-8E show cycling of NaI—$GaCl_3$ by galvanostatic intermittent titration technique (GITT) at 3.5 mA cm$^{-2}$ and 110° C.
Figure 8C:
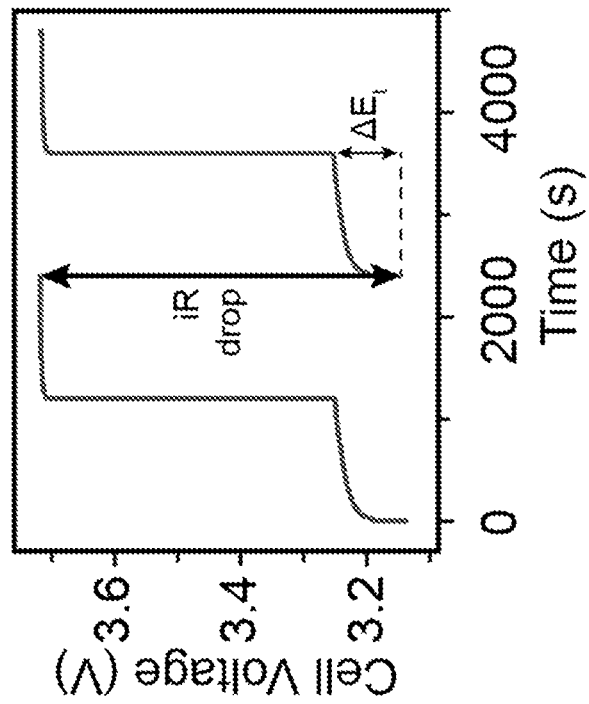
Figure 8B:
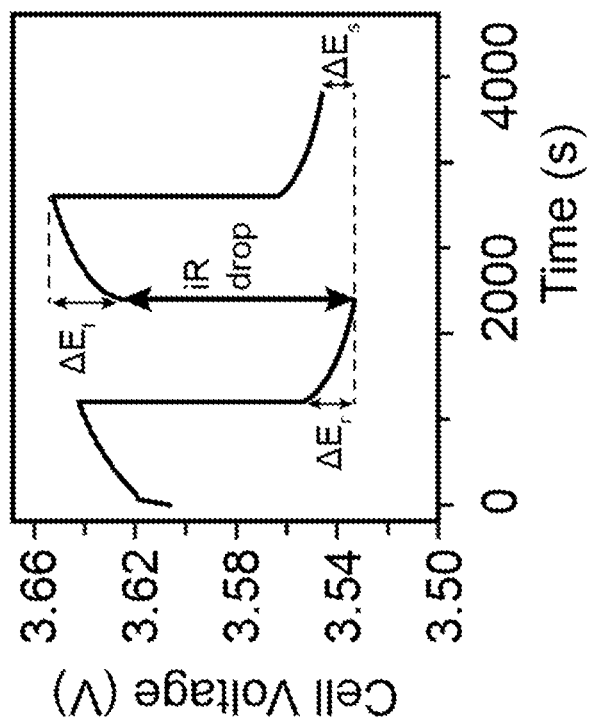
Figure 8E:
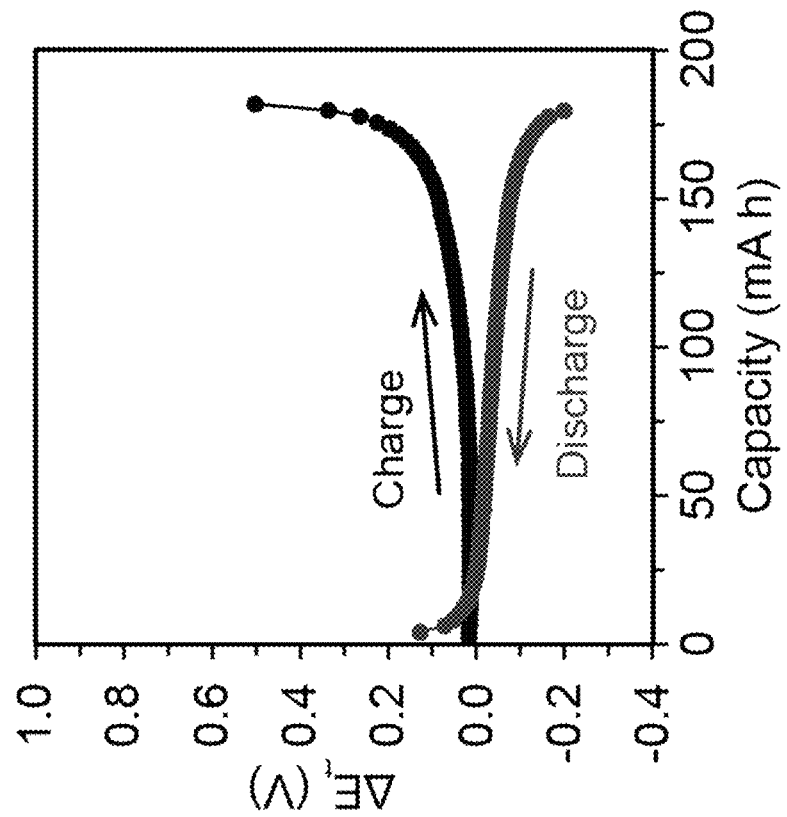
Figure 8D:
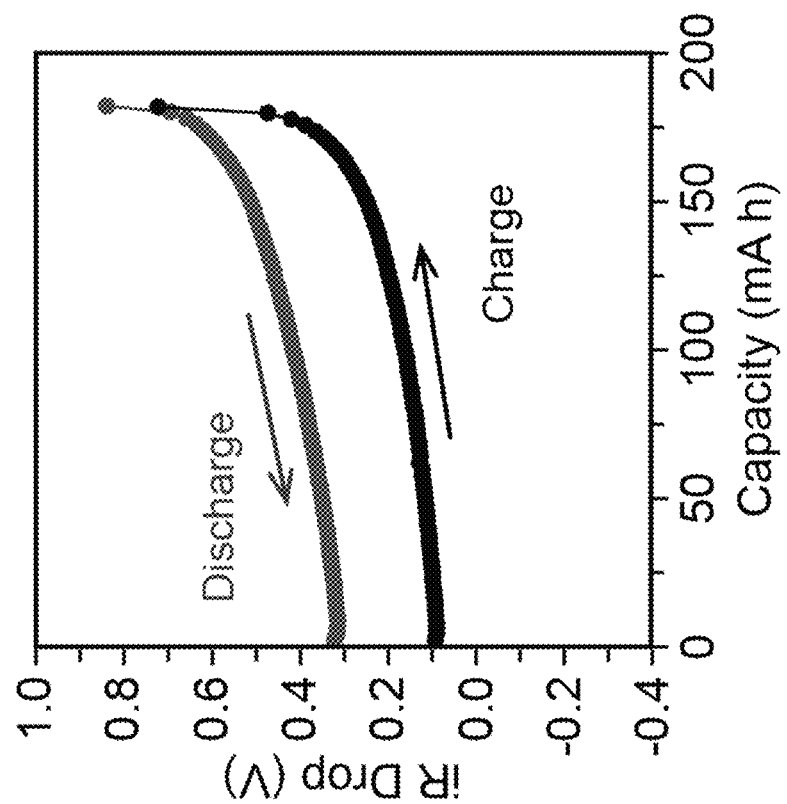

Battery performance was further evaluated by galvanostatic intermittent titration technique (GITT) in 150 mA h full cells assembled with CathD catholyte. The battery was pre-conditioned by cycling at 0.5 mA cm$^{-2}$ and 1 mA cm$^{-2}$ for 1 cycle each before undergoing the GITT cycling schedule. The battery underwent charge-rest cycles of 20 min each at 3.5 mA cm$^{-2}$ until an upper voltage limit of 5 V was reached, and then underwent the same schedule on discharge until 100% coulombic efficiency was reached, as shown in FIG. 8A. Charging to 5 V allowed the battery to exceed the capacity of the I$^-$/I$_3^-$ reaction (4), which likely indicates cycling at least partially into the I$_2$ regime is possible (reaction (6)). The inset in FIG. 8A shows the full voltage profile. FIG. 8B shows representative pulse/rest cycles on charge. The sudden change in voltage when the current is applied, called the iR drop, is related to the ohmic and charge transfer resistances in the battery. The battery overpotential consists of the iR drop plus the voltage change during the current pulse after the initial iR drop, $\Delta E_t$. $\Delta E_t$ is considered the iR-corrected voltage change and is largely related to mass transport resistances in the battery. The charge voltage profile seen in FIG. 8B is what is typically expected in GITT analyses. The discharge voltage however, shown in FIG. 8C, shows an unusual profile, in which an initial spike in the voltage due to a large iR drop occurs before the overpotential decreases, resulting in a negative $\Delta E_t$. This type of profile is usually associated with alleviation of a blockage to ionic or electronic movement in a battery. In flow battery cells, it typically occurs due to alleviation of membrane blockage due to reverse ion movement. See Z. Xie et al., *Front. Mater. Sci.*, 14(4), 442 (2020). In batteries with a solid/liquid phase transition such as that seen in Li—S batteries between the solid sulfur (S) or lithium sulfide (Li$_2$S) and the soluble polysulfide intermediates, it is observed when a blockage of electrode surfaces by S or Li$_2$S is alleviated by the 'breaking' of the solid crystalline product to make it more electrochemically accessible. See Y. Yang et al., *J. Am. Chem. Soc.* 134, 15387 (2012). The iR drop, shown in FIG. 8D, increases on charge and decreases on discharge. In this system, the iR drop dominates over $\Delta E_t$ (FIG. 8E). This indicates that mass transport is not a limiting factor in this system, but rather ohmic and charge transfer losses. The GITT cycling shows that extreme states of charge (e.g. 100% SOC) introduce high battery resistances and voltage loss. Due to the possible formation of a solid product (e.g. I$_2$, per reaction (6)) on charge, intermediate states of charge were chosen for long-term cycling. The cycling range of 37.5-62.5% SOC (56.3-93.8 mA h) exhibits minimal voltage losses, making it a good range for long-term cycling.

Analysis of Battery Voltage

Open circuit voltage of batteries assembled in the fully discharged state (CathD catholyte composition) exhibit an open circuit voltage of 3.42-3.44 V. Charging the battery to 50% SOC results in an OCV of 3.65 V, while fully charging the battery to 100% SOC results in an OCV of 3.71 V (FIG. 8A). These are remarkably high voltages that exceed the theoretical voltage for the $I^-/I_3^-$ reaction (3.24 V). It is likely that the complexation environment of the $I^-$ and $I_3^-$ in the $GaCl_3$ contributes to this higher voltage. A high voltage battery is very desirous for large-scale energy storage, as a high voltage increases the battery's energy density, decreasing the number of individual cells needed to make a given battery pack. This system exhibits a theoretical volumetric capacity of 61 Ah $L^{-1}_{catholyte}$, and due to its exceptionally high voltage, a volumetric energy density of 223 Wh $L^{-1}_{catholyte}$. Recent work on molten sodium battery systems such as the NaS battery, metal-metal halide (ZEBRA) battery, and NaI-metal halide batteries shows a trend towards trying to both lower the battery temperature and increase the battery voltage. See G. Li et al., *J. Mater. Chem. A* 1, 14935 (2013); X. Lu et al., *Energy Environ. Sci.* 6, 299 (2013); X. Lu et al., *Energy Environ. Sci.* 6, 1837 (2013); G. Nikiforidis et al., *J. Electrochem. Soc.* 166, A135 (2019); F. Yang et al., *Adv. Energy Mater.* 8, 1701991 (2018); and E. Gerovasili et al., *J. Power Sources* 251, 137 (2014). The molten sodium battery of the present invention provides a nominal voltage of 3.65 V operating at 110° C.

Example: NaI—GaCl$_3$—AlCl$_3$ Catholyte

Figure 9A:
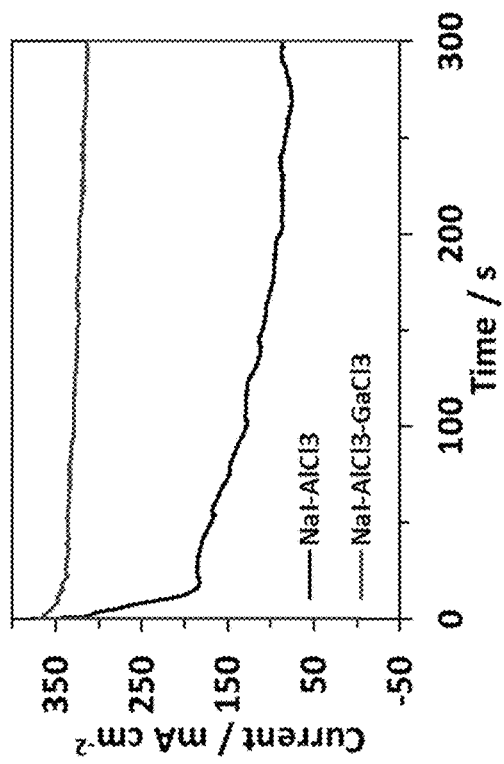
FIG. 9A is a graph showing representative CVs from a glassy carbon electrode in both NaI—$AlCl_3$ and NaI—$AlCl_3$+$GaCl_3$ melts at 110° C.
Figure 9B:
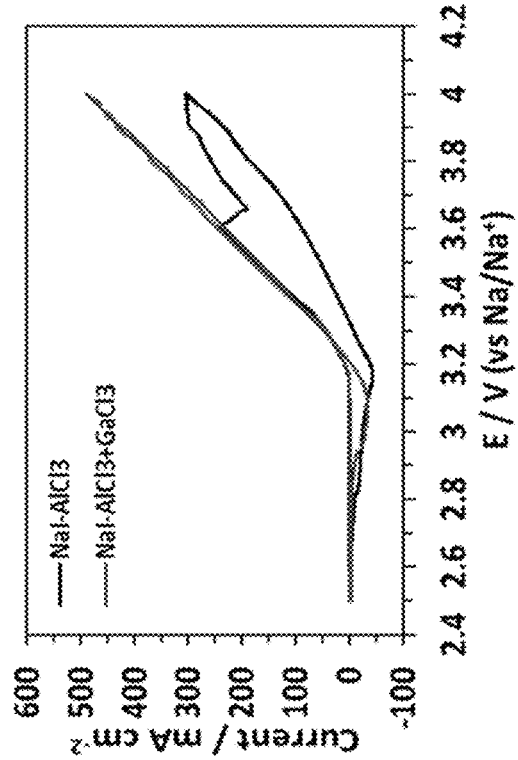
FIG. 9B is a graph of amperometric traces from a glassy carbon electrode biased to 3.7 V (vs. Na/Na$^+$) in both NaI—$AlCl_3$ and NaI—$AlCl_3$—$GaCl_3$ mixtures at 110° C.
Figure 9C:
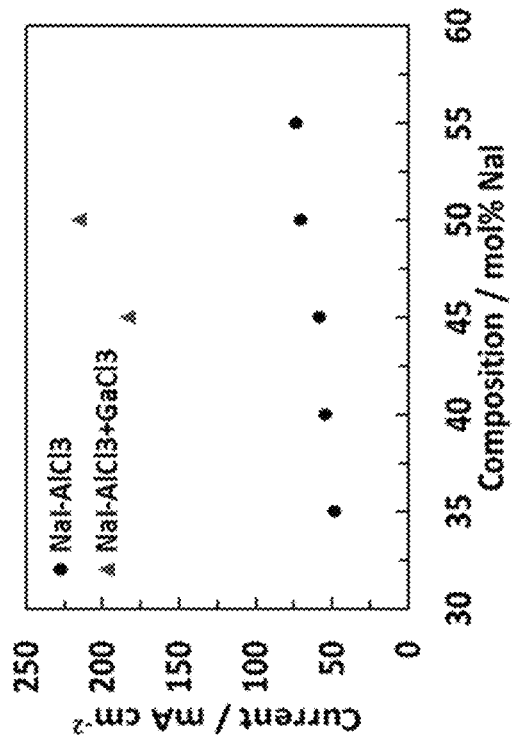
FIG. 9C is a graph of amperometric traces for 5 minutes of being biased at 3.7 V (vs. Na/Na$^+$) of various binary (NaI—$AlCl_3$) and the improved ternary (NaI—$AlCl_3$+$GaCl_3$) compositions.

The catholyte can further comprise at least one aluminum halide salt of the formula AlCl$_3$, AlBr$_3$, or AlI$_3$. For example, the cathoylte can have a composition of 10-60 mol % NaI, y mol % AlCl$_3$, and x mol % GaCl$_3$, where x+y=90-40 mol %. For example, a ternary molten salt composed of 35 to 55 mol % NaI, and (65 to 45)-x mol % AlCl$_3$ with x mol % GaCl$_3$ (where x is between 0.1-5) can improve battery performance. In particular, significant increases in electrochemical stability have been observed in constant potential experiments. FIG. 9A and FIG. 9B show examples of the stabilizing benefits of the added GaCl$_3$ ternary mixture. FIG. 9A shows representative CVs from a glassy carbon electrode in both NaI—AlCl$_3$ and NaI—AlCl$_3$+GaCl$_3$ melts at 110° C. The CVs show similar initial behaviors as the potential is scanned positively, but the CV in the NaI—AlCl$_3$ melt shows a sudden decrease in the current compared to the NaI—AlCl$_3$+GaCl$_3$ melt which has a stabilized current at the electrodes. FIG. 9B shows amperometric traces from a glassy carbon electrode biased to 3.7 V (vs. Na/Na$^+$) in both NaI—AlCl$_3$ and NaI—AlCl$_3$—GaCl$_3$ mixtures at 110° C. The melt of NaI—AlCl$_3$ shows unstable and decreasing current denisites compared to a similar composition, but with 0.1-5 mol % GaCl$_3$ added in place of AlCl$_3$. FIG. 9C shows the amperometric traces for 5 minutes of being biased at 3.7 V (vs. Na/Na$^+$) of various binary (NaI—AlCl$_3$) and the improved ternary (NaI—AlCl$_3$+GaCl$_3$) compositions. The observed current densities of the ternary salts are nearly 4× higher than those of the tested binary salts and represent a significant improvement in catholyte electrochemical behavior.

The present invention has been described as a low temperature sodium battery comprising an electrochemically active molten inorganic catholyte. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A sodium battery, comprising:
   an anode current collector,
   a sodium-based liquid metal anode,
   a nonporous Na+-conducting separator,
   an electrochemically active inorganic molten salt catholyte comprising at least one sodium halide salt, at least one gallium halide salt, and at least one aluminum halide salt, and
   an inert cathode current collector,
   and wherein the inorganic molten salt catholyte comprises from 35 to 55 mol % NaI, (65 to 45)-x mol % AlCl$_3$, and x mol % GaCl$_3$, wherein the x is 0.1 to 5.

2. The sodium battery of claim 1, wherein the sodium-based liquid metal anode comprises molten sodium metal or an alloy of sodium and at least one other alkali metal.

3. The sodium battery of claim 1, wherein the nonporous Na$^+$-conducting separator comprises NaSICON, β''-Al$_2$O$_3$, or a solid Na$^+$ conductor, or a composite thereof.

4. The sodium battery of claim 1, wherein the nonporous Na$^+$-conducting separator further comprises an inert material.

5. The sodium battery of claim 1, wherein the nonporous Na$^+$-conducting separator further comprises a coating capable of forming an intermetallic phase with sodium.

6. The sodium battery of claim 5, wherein the coating comprises tin.

7. The sodium battery of claim 1, wherein the inorganic molten salt catholyte further comprises one or more metal halide salt of formula MX$_y$, where M=Mg, Ca, Sr, Ba, Nb, Ta, Mo, W, In, Sn, Sb, or Bi, and X=F, Cl, Br, or I; and y is a number of halogen atoms in the metal halide salt.

8. The sodium battery of claim 1, wherein the inorganic molten salt catholyte further comprises at least one Lewis acid.

9. The sodium battery of claim 8, wherein the at least one Lewis acid comprises Cl$_2$, Br$_2$, or I$_2$.

10. The sodium battery of claim 9, wherein the inorganic molten salt catholyte comprises the I$_2$.

11. The sodium battery of claim 1, wherein the inorganic molten salt catholyte is at least partially liquid at a temperature less than 150° C.

12. The sodium battery of claim 1, wherein the inorganic molten salt catholyte is fully liquid at a temperature less than 150° C.

13. The sodium battery of claim 12, wherein the inorganic molten salt catholyte is fully liquid at a temperature less than 120° C.

14. The sodium battery of claim 1, wherein the inorganic molten salt catholyte comprises less than 50 mol % sodium halide.

15. The sodium battery of claim 1, wherein the inert cathode current collector comprises tungsten.

16. The sodium battery of claim 1, wherein the inert cathode current collector comprises graphite, carbon felt, or a carbon powder.

* * * * *